US012046748B2

(12) United States Patent
Kuroda et al.

(10) Patent No.: US 12,046,748 B2
(45) Date of Patent: Jul. 23, 2024

(54) NON-AQUEOUS ELECTROLYTE SECONDARY BATTERY

(71) Applicant: Panasonic Intellectual Property Management Co., Ltd., Osaka (JP)

(72) Inventors: Yuta Kuroda, Osaka (JP); Manabu Takijiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 530 days.

(21) Appl. No.: 16/635,018

(22) PCT Filed: Jul. 19, 2018

(86) PCT No.: PCT/JP2018/027023
§ 371 (c)(1),
(2) Date: Jan. 29, 2020

(87) PCT Pub. No.: WO2019/026630
PCT Pub. Date: Feb. 7, 2019

(65) Prior Publication Data
US 2020/0243856 A1  Jul. 30, 2020

(30) Foreign Application Priority Data

Jul. 31, 2017  (JP) .................. 2017-148544

(51) Int. Cl.
*H01M 4/505* (2010.01)
*H01M 4/525* (2010.01)
(Continued)

(52) U.S. Cl.
CPC ........... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 2008/0213670 | A1* | 9/2008 | Okada | H01M 50/491 429/231.95 |
| 2009/0117467 | A1* | 5/2009 | Zhamu | H01M 4/133 429/231.95 |
| 2009/0226811 | A1  | 9/2009 | Nakaoka | |
| 2014/0141314 | A1* | 5/2014 | Kaneda | B05D 1/18 429/211 |

(Continued)

FOREIGN PATENT DOCUMENTS

| CN | 101237069 A | 8/2008 | |
| CN | 105009334   | * 10/2015 | ............ H01M 4/525 |

(Continued)

OTHER PUBLICATIONS

Translation of International Search Report dated Oct. 16, 2018, issued in counterpart Application No. PCT/JP2018/027023. (2 pages).

(Continued)

*Primary Examiner* — Jonathan Crepeau
*Assistant Examiner* — Angela J Martin
(74) *Attorney, Agent, or Firm* — WHDA, LLP

(57) ABSTRACT

A non-aqueous electrolyte secondary battery according to one embodiment of the present disclosure is provided with a positive electrode, a negative electrode, and a non-aqueous electrolyte, wherein the positive electrode includes a positive electrode active material containing a composite oxide particle that includes Ni, Co and Li, and also includes at least one among Mn and Al, and the ratio of Ni to the total number of moles of metal elements excluding Li is 50 mol % or more. In the composite oxide particle, the ratio (A/B) of a BET specific surface area (A) to a theoretical specific surface area (B) determined by the following formula is (Continued)

more than 1.0 and less than 3.3. Theoretical specific surface area (B) ($m^2/g$)=6/(true density ($g/cm^3$)×volume average particle diameter (μm)).

2 Claims, 1 Drawing Sheet

(51) Int. Cl.
*H01M 10/0525* (2010.01)
*H01M 4/02* (2006.01)

(56) References Cited

U.S. PATENT DOCUMENTS

| | | | |
|---|---|---|---|
| 2015/0311516 A1* | 10/2015 | Chen | H01M 4/625 429/223 |
| 2016/0013486 A1 | 1/2016 | Hirai et al. | |

FOREIGN PATENT DOCUMENTS

| | | | | |
|---|---|---|---|---|
| CN | 105009334 A | | 10/2015 | |
| JP | 10-125325 | * | 5/1998 | ............ Y02E 60/10 |
| JP | H10-125325 A | | 5/1998 | |
| JP | 2008-251527 A | | 10/2008 | |
| JP | 2009-205893 A | | 9/2009 | |
| WO | 2011/083648 A1 | | 7/2011 | |
| WO | WO 2011/083648 | * | 7/2011 | ............ H01M 4/525 |
| WO | 2014/133069 A1 | | 9/2014 | |

OTHER PUBLICATIONS

English Translation of Chinese Report dated Jul. 11, 2022, issued in counterpart CN application No. 201880048932.X. (3 pages).
English Translation of Chinese Search Report dated Dec. 15, 2022 for the related Chinese Patent Application No. 201880048932.X. (2 pages).

* cited by examiner

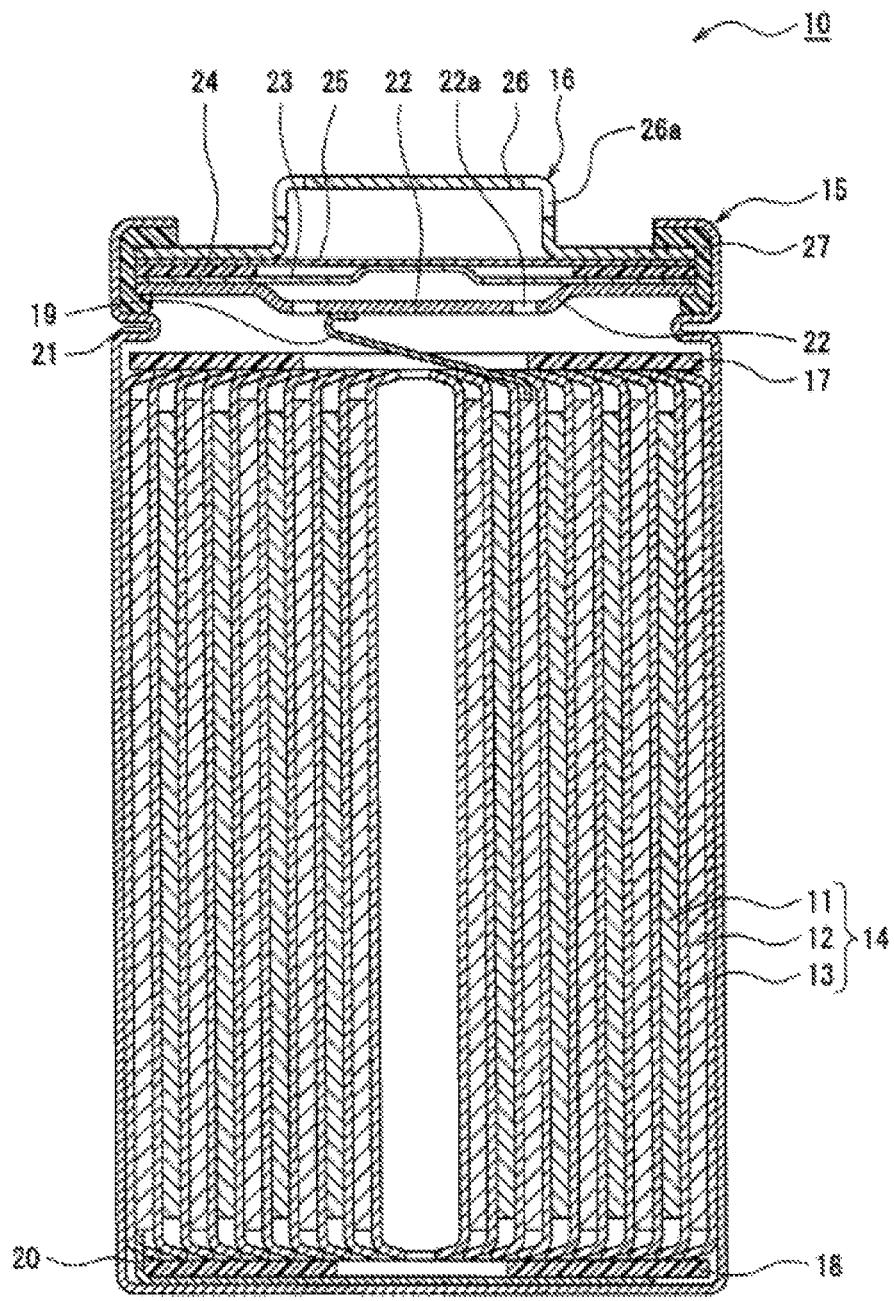

NON-AQUEOUS ELECTROLYTE SECONDARY BATTERY

TECHNICAL FIELD

The present disclosure relates to technology of a non-aqueous electrolyte secondary battery.

BACKGROUND ART

Non-aqueous electrolyte secondary batteries which comprise a positive electrode, a negative electrode and a non-aqueous electrolyte and are charged and discharge by transferring lithium ions between the positive electrode and the negative electrode have been used widely as secondary batteries having high outputs and high energy densities in recent years.

For example, Patent Literature 1 discloses that a lithium nickel manganese cobalt complex oxide is used as a positive electrode active material constituting a positive electrode. Patent Literature 1 discloses that the ratio of the BET specific surface area to the theoretical specific surface area of the lithium nickel manganese cobalt complex oxide is in the range of 5 to 50, and load characteristics of a non-aqueous electrolyte secondary battery can be improved thereby.

CITATION LIST

Patent Literature

PATENT LITERATURE 1: Japanese Unexamined Patent Application Publication No. 2009-205893

SUMMARY

However, according to earnest studies by the present inventors, it is difficult to suppress an increase in the resistance of a non-aqueous electrolyte secondary battery after storage at high temperature (for example, 50° C. or more) even though the technology of Patent Literature 1 is applied when a positive electrode active material including complex oxide particles, including Ni, Co and Li and including at least either of Mn and Al, wherein the ratio of Ni to the total number of moles of the metallic elements except Li is 50 mol % or more is used.

Then, it is an advantage of the present disclosure to provide a non-aqueous electrolyte secondary battery which enables suppressing a resistance increase after storage at high temperature when a positive electrode active material including complex oxide particles, including Ni, Co and Li and including at least either of Mn and Al, wherein the ratio of Ni to the total number of moles of the metallic elements except Li is 50 mol % or more is used.

A non-aqueous electrolyte secondary battery according to one aspect of the present disclosure comprises: a positive electrode; a negative electrode; and a non-aqueous electrolyte, the positive electrode includes a positive electrode active material including complex oxide particles, including Ni, Co and Li and including at least either of Mn and Al, wherein the ratio of Ni to the total number of moles of metallic elements except Li is 50 mol % or more, and the complex oxide particles have a ratio of a BET specific surface area (A) to a theoretical specific surface area calculated by the following expression (B) (A/B) of more than 1.0 and less than 3.3.

Theoretical specific surface area $(B)$ $(m^2/g)$=6/(true density $(g/cm^3)$×volume average particle size $(\mu m)$)

According to the non-aqueous electrolyte secondary battery according to one aspect of the present disclosure, it is possible to suppress an increase in the resistance of the non-aqueous electrolyte secondary battery after storage at high temperature when a positive electrode active material including complex oxide particles, including Ni. Co and Li and including at least either of Mn and Al, wherein the ratio of Ni to the total number of moles of the metallic elements except Li is 50 mol % or more is used.

BRIEF DESCRIPTION OF DRAWINGS

FIG. 1 is a sectional view of a non-aqueous electrolyte secondary battery which is one example of an embodiment.

DESCRIPTION OF EMBODIMENTS

Surfaces of the complex oxide particles, including Ni, Co and Li and including at least either of Mn and Al, wherein the ratio of Ni to the total number of moles of the metallic elements except Li is 50 mol % or more may deteriorate at the time of the storage of the non-aqueous electrolyte secondary battery at high temperature (for example, 50° C. or more). Examples of the surface deterioration of the complex oxide particles include surface deterioration such as the elution of Mn. Al and the like or the production of a compound of nickel and oxygen on the surface of the complex oxide particles. It is considered that an increase in the resistance of the non-aqueous electrolyte secondary battery after storage at high temperature is partly due to such surface deterioration of the complex oxide particles.

Here, the present inventors have examined earnestly and consequently obtained the knowledge that the surface deterioration of the complex oxide particles at the time of storage at high temperature as mentioned above occurs on the surfaces of the particles in contact with the non-aqueous electrolyte, the surface deterioration more easily occurs as the surfaces of the particles become in more complicated shapes, and the surface deterioration more hardly occurs as the surfaces of the particles become more even. The present inventors have considered a non-aqueous electrolyte secondary battery of an aspect described hereinafter from this knowledge.

A non-aqueous electrolyte secondary battery according to one aspect of the present disclosure comprises: a positive electrode; a negative electrode; and a non-aqueous electrolyte, the positive electrode includes a positive electrode active material including complex oxide particles, including Ni, Co and Li and including at least either of Mn and Al, wherein the ratio of Ni to the total number of moles of metallic elements except Li is 50 mol % or more, and the complex oxide particles have a ratio of a BET specific surface area (A) to a theoretical specific surface area calculated by the following expression (B) (A/B) of more than 1.0 and less than 3.3.

Theoretical specific surface area (B) $(m^2/g)$=6/(true density $(g/cm^3)$×volume average particle size $(\mu m)$)

Here, as the ratio of the BET specific surface area (A) to the theoretical specific surface area (B) of the complex oxide particles (A/B) becomes higher, more pores, recesses and projections exist on the surfaces of the complex oxide particles, and the surfaces of the particles become in more complicated shapes. As the ratio of the BET specific surface area (A) to the theoretical specific surface area (B) of the complex oxide particles (A/B) becomes nearer to 1, fewer pores, recesses and projections are on the surfaces of the particles, and the surfaces of the particles become even. It is considered that the ratio of the BET specific surface area (A) to the theoretical specific surface area (B) (A/B) is in the range of more than 1.0 and less than 3.3 like the complex oxide particles of one aspect of the present disclosure, the complex oxide particles having even surfaces end up with being in contact with the non-aqueous electrolyte thereby, the surface deterioration of the complex oxide particles at the time of the storage at high temperature is therefore suppressed, and an increase in the resistance of the non-aqueous electrolyte secondary battery after storage at high temperature is suppressed thereby.

The BET specific surface area (A) of the complex oxide particles is measured in accordance with the BET method (nitrogen adsorption method) described in JIS R1626 herein. The BET nitrogen adsorption isotherm of dry complex oxide particles is specifically measured using an automatic specific surface area/pore distribution measuring apparatus (Autosorb iQ3-MP manufactured by Quantachrome Instruments), and the specific surface area is calculated from the amount of nitrogen adsorbed using a BET multipoint method. The nitrogen adsorption isotherm is measured using nitrogen as an adsorbate under the condition that the adsorbate cross-sectional area is 0.162 nm$^2$ in a constant volume method.

The true density of the complex oxide particles used when the theoretical specific surface area (B) of the complex oxide particles is calculated can be measured using a dry automatic densimeter (AccuPyc II 1340 manufactured by SHIMADZU CORPORATION), and is an average value when the true density is measured 3 times by the equipment herein.

The volume average particle size of the complex oxide particles used when the theoretical specific surface area (B) of complex oxide particles is calculated can be measured using a laser diffraction and scattering particle size distribution measuring apparatus (MT3000II manufactured by MicrotracBEL Corp.), and means a median size at which the volume integrated value is 50% e in the particle size distribution herein.

An example of embodiments will be described in detail hereinafter. The drawing referred to in the explanation of embodiments is described schematically, and the dimensional ratios and the like of components depicted in the drawing may be different from those of actual articles.

FIG. 1 is a sectional view of a non-aqueous electrolyte secondary battery which is an example of embodiments. A non-aqueous electrolyte secondary battery 10 shown in FIG. 1 comprises: a wound electrode assembly 14 formed by winding a positive electrode 11 and a negative electrode 12 through a separator 13; a non-aqueous electrolyte; insulating plates 17 and 18 disposed above and below the electrode assembly 14, respectively; and a battery case storing the above-mentioned members. The battery case is constituted by a bottomed cylindrical case body 15 and a sealing assembly 16. An electrode assembly in another shape such as a layered electrode assembly in which a positive electrode and a negative electrode through a separator are layered by turns may be applied instead of the wound electrode assembly 14. Examples of the battery case include metal cases such as cylindrical shapes, square shapes, coin shapes and button shapes; and cases made of resins (laminated batteries) formed by laminating resin sheets.

The case body 15 is, for example, a bottomed cylindrical metal container. A gasket 27 is provided between the case body 15 and the sealing assembly 16, and the sealability in the battery case is secured. The case body 15 preferably has a projecting portion 21 which is formed, for example, by pressing a side portion from outside and supports the sealing assembly 16. The projecting portion 21 is preferably formed in a ring shape along the circumferential direction of the case body 15, and supports the sealing assembly 16 on its upper surface.

The sealing assembly 16 has a filter 22 in which the openings of the filter 22a are formed, and vent members disposed on the filter 22. The vent members (a lower vent member 23, an upper vent member 25 and the like) cover the openings of the filter 22a of the filter 22. When the internal pressure of the battery increases by heat generation due to an internal short circuit or the like, the vent members rupture. In the present embodiment, the lower vent member 23 and the upper vent member 25 are provided as the vent members, and an insulating member 24 disposed between the lower vent member 23 and the upper vent member 25, and a cap 26 having cap openings 26a are further provided. Members constituting the sealing assembly 16 have, for example, disk shapes or ring shapes, and the members except the insulating member 24 are electrically connected with each other. The filter 22 and the lower vent member 23 are specifically mutually united at the peripheries. The upper vent member 25 and the cap 26 are mutually united at the peripheries. The lower vent member 23 and the upper vent member 25 are connected with each other at the centers, and the insulating member 24 is between the peripheries. When the internal pressure increases by heat generation due to an internal short circuit or the like, for example, the thin portion of the lower vent member 23 ruptures. The upper vent member 25 swells to the cap 26 side thereby, and are separated from the lower vent member 23. The electrical connection between both is cut off thereby.

In the non-aqueous electrolyte secondary battery 10 shown in FIG. 1, a positive electrode lead 19 attached to the positive electrode 11 extends to the sealing assembly 16 side through the through hole of the insulating plate 17, and a negative electrode lead 20 attached to the negative electrode 12 extends to the bottom side of the case body 15 through the outside of the insulating plate 18. For example, the positive electrode lead 19 is connected with the bottom surface of the filter 22, which is the bottom plate of the sealing assembly 16, by welding or the like. The cap 26, which is the top plate of the sealing assembly 16 electrically connected with the filter 22, is a positive electrode terminal. The negative electrode lead 20 is connected with the bottom of the inside of the case body 15 by welding or the like. The case body 15 is a negative electrode terminal.

[Positive Electrode]

The positive electrode 11 comprises, for example, a positive electrode current collector and a positive electrode active material layer formed on the positive electrode current collector. Foil of a metal such as aluminum which is stable in the potential range of the positive electrode, a film wherein the metal is disposed on the outer layer, or the like can be used for the positive electrode current collector.

The positive electrode active material layer includes a positive electrode active material. The positive electrode active material layer preferably includes a binding agent in that positive electrode active materials can be bound to secure the mechanical strength of the positive electrode active material layer, or the binding property between the positive electrode active material layer and the positive electrode current collector can be increased. The positive electrode active material layer preferably includes a conductive agent in that the conductivity of the layer can be improved.

The positive electrode active material includes complex oxide particles, including Ni, Co and Li and including at least either of Mn and Al, wherein the ratio of Ni to the total number of moles of the metallic elements except Li is 50 mol % or more. This complex oxide particles will be called complex oxide particles with a high content of Ni hereinafter.

The complex oxide particles with a high content of Ni are preferably, for example, complex oxide particles represented by the general formula $Li_xNi_{1-y-z}Co_yM_zO_2$ wherein $0.9 \leq x \leq 1.2$, $0 < y+z < 0.5$, and M is at least one metallic element of the group consisting of Al and Mn. Although the rate of Ni of the complex oxide particles with a high content of Ni may be 50 mol % or more as mentioned above, the rate is preferably 80 mol % or more and 95 mol % or less (in the case of the above-mentioned general formula, it is preferable that $0.05 \leq y+z \leq 0.2$), for example, from the viewpoint that the capacity of the non-aqueous electrolyte secondary battery can be increased. The complex oxide particles with a high content of Ni may include metallic elements other than Li, Ni, Co, Al and Mn. and examples of the metallic elements include Na, Mg, Sc, Y, Fe, Cu, Zu, Cr, Pb, Sb and B.

Although the ratio of the BET specific surface area (A) to the theoretical specific surface area (B) (A/B) in the complex oxide particles with a high content of Ni may be more than 1.0 and less than 3.3 from the viewpoint of suppressing an increase in the resistance of the non-aqueous electrolyte secondary battery after storage at high temperature, the ratio is preferably more than 1.0 and less than 2.5 further in that a decrease in the battery capacity of the non-aqueous electrolyte secondary battery after storage at high temperature is suppressed.

As long as the ratio of the BET specific surface area (A) to the theoretical specific surface area (B) (A/B) satisfies the above-mentioned range, the BET specific surface area of the complex oxide particles with a high content of Ni is not particularly limited, and is preferably 0.2 m²/g or more and 5 m²/g or less. When the BET specific surface area of complex oxide particles with a high content of Ni is less than 0.2 m²/g, load characteristics may decrease and the energy density as a battery may decrease as compared with when the above-mentioned range is satisfied. When the BET specific surface areas of complex oxide particles with a high content of Ni are more than 5 m²/g, the particle size is too small, the polar plate density of the positive electrode may therefore decrease, and the energy density as a battery may decrease as compared with when the above-mentioned range is satisfied.

As long as the ratio of the BET specific surface area (A) to the theoretical specific surface area (B) (A/B) satisfies the above-mentioned range, the volume average particle size of the complex oxide particles with a high content of Ni is not particularly limited, and is, for example, preferably 2 μm or more and 6 μm or less. When the volume average particle size of the complex oxide particles with a high content of Ni is less than 2 μm or more than 6 μm, for example, the packing density in the positive electrode active material layer may decrease, and the capacity of the non-aqueous electrolyte secondary battery may decrease as compared with when the above-mentioned range is satisfied.

As long as the ratio of the BET specific surface area (A) to the theoretical specific surface area (B) (A/B) satisfies the above-mentioned range, the true density of the complex oxide particles with a high content of Ni is not particularly limited, and is, for example, preferably 4.3 g/cm³ or more and 4.7 g/cm³ or less. When the true density of the complex oxide particles with a high content of Ni is less than 4.3 g/cm³, for example, the packing density in a positive electrode active material layer may decrease, and the capacity of the non-aqueous electrolyte secondary battery may decrease as compared with when the above-mentioned range is satisfied. When the true density of the complex oxide particles with a high content of Ni is more than 4.7 g/cm³, the packing density in the positive electrode active material layer may be too high, the permeation of the non-aqueous electrolyte among particles may decrease, and output characteristics of the non-aqueous electrolyte secondary battery may decrease as compared with when the above-mentioned range is satisfied.

If the ratio of the BET specific surface area (A) to the theoretical specific surface area (B) (A/B) satisfies the above-mentioned range, the complex oxide particles with a high content of Ni may be unaggregated particles, may be aggregated particles, or may exist as a mixture of particles in both states. That is, the complex oxide particles with a high content of Ni may exist as unaggregated particles, may exist as aggregated particles, or may exist as a mixture of unaggregated and aggregated particles in the positive electrode active material layer. Here, the unaggregated state include not only a state in which particles are completely separated into individual primary particles but also a state in which around several (for example, 2 to 15) primary particles are gathered. The aggregated state is a state in which 16 or more primary particles are gathered. It may be determined by sectional SEM image through a scanning electron microscope (SEM) whether the complex oxide particles with a high content of Ni are unaggregated or aggregated. For example, the determination may be performed by embedding the positive electrode 11 into a resin, preparing a section of the positive electrode by cross section polisher (CP) processing or the like, and photographing a section of the positive electrode active material layer in this section through the SEM. Alternatively, the determination may be performed by embedding the complex oxide particles with a high content of Ni into a resin, preparing a section of the complex oxide particles with a high content of Ni by cross section polisher (CP) processing or the like, and photographing this section through the SEM. Particles wherein the particle sizes confirmed in a sectional SEM image are in the error range of 10% or less from the volume average particle size are first selected, and the primary particle sizes are confirmed. Each primary particle and each aggregated particle are considered as true spheres, and the quantification of a state in which primary particles are gathered is calculated by the ratio of the volume of the primary particle to the volume estimated from the volume average particle.

When unaggregated complex oxide particles with a high content of Ni are used, the distortion in the particles due to the volume expansion and contraction in charge and discharge cycles is low, the breakage of the particles is suppressed, and charge and discharge cycle characteristics of the non-aqueous electrolyte secondary battery can therefore be improved as compared with when aggregated complex oxide particles with a high content of Ni are used. Meanwhile, when aggregated complex oxide particles with a high content of Ni are used, the synthesis can be easily performed, and a manufacturing cost can therefore be reduced low as compared with when unaggregated complex oxide particles with a high content of Ni are used.

The content of the complex oxide particles with a high content of Ni is, for example, preferably 30%/o by mass or more and 100% by mass or less, and more preferably 80% by mass or more and 95% by mass or less based on the total amount of the positive electrode active material. When the content of the complex oxide particles with a high content of Ni in the positive electrode active material layer is less than 30% by mass, for example, the effect of suppressing an increase in the resistance of the non-aqueous electrolyte secondary battery after storage at high temperature may decrease as compares with when the above-mentioned range is satisfied. The positive electrode active material may include particles of a positive electrode active material other than the complex oxide particles with a high content of Ni, examples of the particles include complex oxide particles such as $LiCoO_2$ and $LiMn_2O_4$ not including Ni, and complex oxide particles wherein the ratio of Ni to the total number of moles of the metallic elements except Li is less than 50 mol %.

The content of the positive electrode active material is, for example, preferably 70% by mass or more and 98% by mass or less, and more preferably 80% by mass or more and 95% by mass or less based on the total amount of the positive electrode active material layer.

An example of a method for producing complex oxide particles with a high content of Ni will be described.

A method for producing complex oxide particles with a high content of Ni include: a complex hydroxide synthesis step of obtaining a Ni, Co and Al complex hydroxide, a Ni, Co and Mn complex hydroxide, or the like; a raw material mixing step of mixing the complex hydroxide and a lithium compound to obtain a raw material mixture; and a firing step of firing the raw material mixture to obtain complex oxide particles with a high content of Ni.

Examples of the complex hydroxide synthesis step include a coprecipitation method for dropping a solution of an alkali such as sodium hydroxide with stirring a solution of metal salts including Ni, Co, Al (or Mn) and the like, and adjusting the pH to the alkali side (for example, 8.5 to 11.5) to deposit (coprecipitate) a Ni, Co and Al complex hydroxide or a Ni, Co and Mn complex hydroxide. The complex hydroxide synthesis step may include an aging step of maintaining the complex hydroxide in the reaction solution after the precipitation of the complex hydroxide as it is.

The raw material mixing step is a method of, for example, mixing the above-mentioned complex hydroxide and a lithium compound such as lithium hydroxide, lithium carbonate or lithium nitrate to obtain a raw material mixture. Adjusting the mixing ratio of the complex hydroxide to the lithium compound enables controlling the ratio of the BET specific surface area (A) to the theoretical specific surface area (B) (A/B) in the complex oxide particles with a high content of Ni obtained finally. The mixing ratio of the complex hydroxide to the lithium compound is preferably a ratio wherein metallic elements (Ni+Co+Al or Mn):Li is in the range of 1.0:1.02 to 1.0:1.2 by molar ratio in that the ratio of the BET specific surface area (A) to the theoretical specific surface area (B) (A/B) is more than 1 and less than 3.3.

The firing step is a method, for example, for firing the above-mentioned raw material mixture in an oxygen atmosphere to obtain complex oxide particles with a high content of Ni. Also adjusting the firing temperature of the raw material mixture enables controlling the ratio of the BET specific surface area (A) to the theoretical specific surface area (B) (A/B) in the complex oxide particles with a high content of Ni obtained finally. The firing temperature of the raw material mixture is, for example, preferably in the range of 750° C. or more 1100° C. or less in that the ratio of the BET specific surface area (A) to the theoretical specific surface area (B) (A/B) is more than 1 and less than 3.3.

Examples of the conductive agent included in the positive electrode active material layer include carbon powders such as carbon black, acetylene black, ketjen black and graphite. These may be used singly or in combinations of two or more.

Examples of the binding agent included in the positive electrode active material layer include fluorine-containing polymers and rubber-based polymers. Examples of the fluorine-containing polymers include polytetrafluoroethylene (PTFE), polyvinylidene fluoride (PVDF) or modified products thereof. Examples of the rubber-based polymers include an ethylene-propylene-isoprene copolymer and an ethylene-propylene-butadiene copolymer. These may be used singly or in combinations of two or more.

The positive electrode 11 of the present embodiment is obtained, for example, by forming a positive electrode active material layer on a positive electrode current collector by applying positive electrode mixture slurry including the positive electrode active material, the conductive agent, the binding agent and the like and drying the slurry, and rolling the positive electrode mixture layer.

[Negative Electrode]

The negative electrode 12 comprises, for example, a negative electrode current collector and a negative electrode active material layer formed on the negative electrode current collector. Foil of a metal such as copper which is stable in the potential range of the negative electrode, a film wherein the metal is disposed on the outer layer, or the like can be used for the negative electrode current collector. The negative electrode active material layer includes, for example, a negative electrode active material, a binding agent, a thickening agent, and the like.

The negative electrode active material is not particularly limited as long as the active material is a material which can occlude and emit lithium ions, and examples of the active material include metal lithium; lithium alloys such as a lithium-aluminum alloy, a lithium-lead alloy, a lithium-silicon alloy and a lithium-tin alloy; carbon materials such as graphite, coke and a fired organic substance; and metal oxides such as $SnO_2$, SnO and $TiO_2$. These may be used singly or in combinations of two or more.

Although, for example, a fluorine-containing polymer, a rubber-based polymer, or the like can also be used as the binding agent, as is the case with the positive electrode, a styrene-butadiene copolymer (SBR) or a modified product thereof may be used.

Examples of the thickening agent include carboxymethyl cellulose (CMC) and polyethylene oxide (PEO). These may be used singly or in combinations of two or more.

The negative electrode 12 of the present embodiment is obtained, for example, by forming a negative electrode active material layer on a negative electrode current collector by applying negative electrode mixture slurry including the negative electrode active material the binding agent, the thickening agent and the like and drying the slurry, and rolling the negative electrode active material layer.

[Separator]

For example, a porous sheet or the like having ion permeability and insulation properties is used for the separator 13. Specific examples of the porous sheet include fine porous thin films, woven fabrics and nonwoven fabrics. As the material of the separator, olefin-based resins such as polyethylene and polypropylene; cellulose; and the like are preferable. The separator may be a layered body having a cellulose fiber layer and a thermoplastic resin fiber layer of an olefin-based resin or the like. The separator may be a multilayer separator including a polyethylene layer and a polypropylene layer, and a separator wherein a material such as an aramid-based resin or a ceramic is applied to the surface of the separator may be used.

[Non-Aqueous Electrolyte]

A non-aqueous electrolyte includes a non-aqueous solvent and an electrolyte salt dissolved in the non-aqueous solvent. The non-aqueous electrolyte is not limited to a liquid electrolyte (non-aqueous electrolytic solution), and may be a solid electrolyte using a gel polymer or the like.

Examples of the non-aqueous solvent include cyclic carbonates; chain-like carbonates; carboxylate esters; cyclic ethers; chain-like ethers; nitriles such as acetonitrile; amides such as dimethylformamide; and mixed solvents of these.

Examples of the above-mentioned cyclic carbonates include ethylene carbonate (EC), propylene carbonate (PC) and butylene carbonate. The cyclic carbonates may include a fluorine-containing cyclic carbonate containing at least one fluorine atom.

Examples of the cyclic carbonates include monofluoroethylene carbonate (FEC), 1,2-difluoroethylene carbonate, 1,2,3-trifluoropropylene carbonate, 2,3-difluoro-2,3-butylene carbonate and 1,1,1,4,4,4-hexafluoro-2,3-butylene carbonate. These may be singly or in combinations of two or more. The non-aqueous solvent preferably includes a fluorine-containing cyclic carbonate in that a decrease in the charge and discharge cycle characteristics of the non-aqueous electrolyte secondary battery is suppressed.

Examples of the above-mentioned chain-like carbonates include dimethyl carbonate, methyl ethyl carbonate (EMC), diethyl carbonate, methyl propyl carbonate, ethyl propyl carbonate and methyl isopropyl carbonate.

Examples of the above-mentioned carboxylate esters include methyl acetate, ethyl acetate, propyl acetate, methyl propionate (MP), ethyl propionate and 7-butyrolactone. These may be singly or in combinations of two or more.

Examples of the above-mentioned cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers. These may be singly or in combinations of two or more.

Examples of the above-mentioned chain-like ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, and benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl. These may be singly or in combinations of two or more.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ wherein $1<x<6$, and n is 1 or 2, $LiB_{10}Cl_{10}$, $LiCl$, $LiBr$, $LiI$, lithium chloroborane, lithium lower aliphatic carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_nF_{m+1}SO_2)$ wherein l and m are integers of 0 or more. These lithium salts may be used singly or as a mixture of two or more. Among these, $LiPF_6$ are preferably used from the viewpoints of ion conductivity, electrochemical stability and the like. The concentration of the lithium salt is preferably 0.8 to 1.8 mol per 1 L of the non-aqueous solvent.

EXAMPLES

Although the present disclosure will be further described by Examples hereinafter, the present disclosure is not limited to the following Examples.

Example 1

[Production of Complex Oxide Particles with High Content of Ni]

$[Ni_{0.5}Co_{0.2}Mn_{0.3}](OH)_2$ obtained by a coprecipitation method and $Li_2CO_3$ were mixed in an Ishikawa-type grinding mortar so that the molar ratio of Li to the total amount of Ni, Co and Mn was 1.1:1.0. Thereafter, this mixture is fired in the air atmosphere at 1000° C. for 20 hours and then pulverized to obtain complex oxide particles a with a high content of Ni. The obtained complex oxide particles a with a high content of Ni had a BET specific surface area (A) of 0.56 m²/g, a volume average particle size of 5.6 μm and a true density of 4.67 g/cm³. Therefore, the theoretical specific surface area (B) of the complex oxide particles with a high content of Ni was 0.23, and the ratio of the BET specific surface area (A) to the theoretical specific surface area (B) was 2.44.

[Manufacturing of Positive Electrode]

The above-mentioned complex oxide particles a with a high content of Ni as a positive electrode active material, acetylene black as a conductive agent, and polyvinylidene fluoride as a binding agent were mixed so that the mass ratio was 91:7:2. N-methyl-2-pyrrolidone was then added to prepare positive electrode mixture slurry. Subsequently, this positive electrode mixture slurry was applied to both sides of the positive electrode current collector comprising aluminum foil, and this was dried and then rolled with a rolling roller to manufacture a positive electrode in which positive electrode active material layers were formed on both sides of the positive electrode current collector.

[Manufacturing of Negative Electrode]

Graphite as a negative electrode active material, a styrene-butadiene copolymer (SBR) as a binding agent, and carboxymethyl cellulose (CMC) as a thickening agent were mixed so that the mass ratio was 100:1:1, water was added to prepare negative electrode mixture slurry. Subsequently, the negative electrode mixture slurry was applied to both sides of a negative electrode current collector comprising copper foil, and this was dried and then rolled with the rolling roller to manufacture a negative electrode in which negative electrode active material layers were formed on both sides of the negative electrode current collector.

[Preparation of Non-Aqueous Electrolyte]

LiPF$_6$ was dissolved in a mixed solvent obtained by mixing ethylene carbonate (EC), propylene carbonate (PC), dimethyl carbonate (DMC) and ethyl methyl carbonate (EMC) so that the volume ratio was 20:5:35:40 so that the concentration was 1.4 mol/L. A non-aqueous electrolyte was prepared.

[Manufacturing of Non-Aqueous Electrolyte Secondary Battery]

The above-mentioned positive electrode and negative electrode were wound through a separator to manufacture an electrode assembly, the electrode assembly was stored with the above-mentioned non-aqueous electrolyte in a bottomed cylindrical battery case, and the opening of the battery case was sealed with a gasket and a sealing assembly. This was used as the non-aqueous electrolyte secondary battery of Example 1.

Example 2

[Ni$_{0.5}$Co$_{0.2}$Mn$_{0.3}$](OH)$_2$ obtained by the coprecipitation method and Li$_2$CO$_3$ were mixed in an Ishikawa-type grinding mortar so that the molar ratio of Li to the total amount of Ni. Co and Mn was 1.1:1.0. Thereafter, this mixture is fired in the air atmosphere at 1000° C. for 40 hours and then pulverized to obtain complex oxide particles 3 with a high content of Ni. The obtained complex oxide particles 3 with a high content of Ni had a BET specific surface area (A) of 0.43 m$^2$/g, a volume average particle size of 5.4 μm and a true density of 4.67 g/cm$^3$. Therefore, the theoretical specific surface area (B) of the complex oxide particles with a high content of Ni was 0.24, and the ratio of the BET specific surface area (A) to the theoretical specific surface area (B) was 1.81. A positive electrode was manufactured in the same way as in Example 1, and a non-aqueous electrolyte secondary battery was manufactured in the same way as in Example 1 except that this complex oxide particles p with a high content of Ni was used.

Comparative Example

[Ni$_{0.5}$Co$_{0.2}$Mn$_{0.3}$](OH)$_2$ obtained by the coprecipitation method and Li$_2$CO$_3$ were mixed in an Ishikawa-type grinding mortar so that the molar ratio of Li to the total amount of Ni, Co and Mn was 1.1:1.0. Thereafter, this mixture is fired in the air atmosphere at 950° C. for 10 hours and then pulverized to obtain complex oxide particles y with a high content of Ni. The obtained complex oxide particles y with a high content of Ni had a BET specific surface area (A) of 0.41 m$^2$/g, a volume average particle size of 13.7 μm, and a true density of 4.65 g/cm$^3$. Therefore, the theoretical specific surface area (B) of the complex oxide particles with a high content of Ni was 0.09, and the ratio of the BET specific surface area (A) to the theoretical specific surface area (B) was 4.35. A positive electrode was manufactured in the same way as in Example 1 except that this complex oxide particles y with a high content of Ni were used. A non-aqueous electrolyte secondary battery was manufactured in the same way as in Example 1.

[Measurement of Rate of Increase in Resistance after Storage at High Temperature]

Each of the non-aqueous electrolyte secondary batteries of the Examples and the Comparative Example was charged under a condition of 25° C. at a constant current of 0.5 It to a SOC of 50%. The voltage at this time was $V_0$. Next, discharge was performed at a constant current of 0.5 It for 10 seconds. The voltage at this time was $V_1$. The direct-current resistance (DCR) was calculated from the following expression. This is initial direct-current resistance.

$$DCR=(V_0-V_1)/0.5 \text{ It}$$

Next, under a condition of 55° C., each of the non-aqueous electrolyte secondary batteries of the Examples and the Comparative Example was charged at a constant current of 0.5 It until the voltage was 4.3 V, the battery was then subjected to constant voltage charge until the current reached 0.05 It, and the battery was stored in the state for 30 days. Under a condition of 25° C., each of the non-aqueous electrolyte secondary batteries of the Examples and the Comparative Example was subjected to constant current discharge at a constant current of 0.5 It until the voltage was 3.0 V, and the direct-current resistance was then determined by the same method as the above. This is defined as a direct-current resistance after storage at high temperature.

The initial direct-current resistance and the direct-current resistance after storage at high temperature were applied to the following expression to calculate the rate of increase in resistance.

Rate of increase in resistance=((direct-current resistance after storage at high temperature−initial direct-current resistance)/initial direct-current resistance)×100

[Measurement of Rate of Decrease in Capacity after Storage at High Temperature]

Under a condition of 25° C., each of the non-aqueous electrolyte secondary batteries of the Examples and the Comparative Example was charged at a constant current of 0.5 It until the voltage was 4.3 V, the battery was then subjected to constant voltage charge until the current reached 0.05 It, and the battery was subjected to constant current discharge at a constant current of 0.5 It until the voltage was 3.0 V. The discharge capacity at this time was defined as an initial capacity.

Next, under a condition of 55° C., each of the non-aqueous electrolyte secondary batteries of the Examples and the Comparative Example was charged at a constant current of 0.5 It until the voltage was 4.3 V, and the battery was then subjected to constant voltage charge until the current reached 0.05 It, and the battery was stored in the state for 30 days. Under a condition of 25° C., each of the non-aqueous electrolyte secondary batteries of the Examples and the Comparative Example was subjected to constant current discharge at a constant current of 0.5 It until the voltage was 3.0 V. The discharge capacity at this time was defined as a capacity after storage at high temperature.

The initial capacity and the capacity after storage at high temperature were applied to the following expression to calculate the rate of decrease in capacity.

Rate of decrease in capacity=((capacity after storage at high temperature−initial capacity)/initial capacity)×100

Table 1 shows the volume average particle size, the BET specific surface area (A), the theoretical specific surface area (B), the A/B, the rate of increase in resistance, and the rate of decrease in capacity after storage at high temperature of the complex oxide particles with a high content of Ni used in each of the Examples and the Comparative Example. As to the rate of increase in resistance and the rate of decrease in capacity after storage at high temperature, the results of Examples 1 and 2 are relatively shown with the result of the Comparative Example defined as a standard (100%).

TABLE 1

| | Complex oxide particles with high content of Ni | | | | Rate of increase in resistance after storage at high temperature | Rate of decrease in capacity after storage at high temperature |
|---|---|---|---|---|---|---|
| | Volume Average particle size | BET specific surface area (A) | Theoretical specific surface area (B) | A/B | | |
| Example 1 | 5.6 μm | 0.56 m²/g | 0.23 m²/g | 2.44 | 45% | 98% |
| Example 2 | 5.4 μm | 0.43 m²/g | 0.24 m²/g | 1.81 | 12% | 63% |
| Comparative Example | 13.7 μm | 0.41 m²/g | 0.09 m²/g | 4.35 | 100% | 100% |

As to Examples 1 and 2 using positive electrode active materials including complex oxide particles, including Ni, Co, Mn and Li, wherein the ratio of Ni to the total number of moles of the metallic elements except Li is 50 mol % or more, the resistance increases after storage at high temperature of Examples 1 and 2, wherein the ratios of the BET specific surface areas (A) to the theoretical specific surface areas (B) (A/B) were more than 1.0 and less than 2.5, were suppressed, and the capacity decreases after storage at high temperature of Examples 1 and 2 were also suppressed as compared with the Comparative Example, wherein the ratio of the BET specific surface area (A) to the theoretical specific surface area (B) (A/B) is 4.35. It can be said that if the result is 90% or less with the result of the Comparative Example defined as a standard (100%), the result is at a level which satisfies a request of batteries for long-term use limitedly in that a resistance increase after storage at high temperature is suppressed. The upper limit of the ratio of the BET specific surface area (A) to the theoretical specific surface area (B)(A/B) wherein the result is 90% or less with the result of the Comparative Example defined as a standard (100%) is less than 3.3 from the correlation between the ratios of the BET specific surface areas (A) to the theoretical specific surface areas (B) (A/B) and the rates of increase in the resistances of the Examples.

REFERENCE SIGNS LIST 10 non-aqueous electrolyte secondary battery
11 positive electrode
12 negative electrode
13 separator
14 electrode assembly
15 case body
16 sealing assembly
17,18 insulating plates
19 positive electrode lead
20 negative electrode lead
21 projecting portion
22 filter
22a opening of filter
23 lower vent member
24 insulating member
25 upper vent member
26 cap
26a cap opening
27 gasket

The invention claimed is:

1. A non-aqueous electrolyte secondary battery, comprising:
    a positive electrode;
    a negative electrode; and
    a non-aqueous electrolyte, wherein
    the positive electrode includes a positive electrode active material including complex oxide particles, including Ni, Co and Li and including at least either of Mn and Al, wherein a ratio of Ni to a total number of moles of metallic elements except Li is 50 mol % or more, and
    the complex oxide particles have a ratio (A/B) of a BET specific surface area (A) (m²/g) to a theoretical specific surface area calculated by the following expression (B) (m²/g) of more than 1.0 and equal to or less than 1.81:
    Theoretical specific surface area (B) (m²/g)=6/(true density (g/cm³)×volume average particle size (μm)),
    wherein the volume average particle size of the complex oxide particles is 2 μm or more and 6 μm or less, wherein the volume average particle size is measured as to primary particles of the complex oxide particles, and
    the BET specific surface area (A) is 0.2 m²/g or more and 5 m²/g or less.

2. The non-aqueous electrolyte secondary battery according to claim 1, wherein
    the true density of the complex oxide particles is 4.3 g/cm³ or more and 4.7 g/cm³ or less.

* * * * *